United States Patent
Amend et al.

(10) Patent No.: US 9,242,387 B2
(45) Date of Patent: Jan. 26, 2016

(54) FROZEN CONFECTIONERY PRODUCT WITH A PEELABLE GEL COATING AND METHOD FOR MANUFACTURING SAME

(75) Inventors: Thomas Aloisius Valentinus Amend, Mountain View, CA (US); Visit Sridama, Saimai Bangkok (TH); Changpu Ma, Shanghai (CN)

(73) Assignee: Nestec S.A., Vevey (CH)

(*) Notice: Subject to any disclaimer, the term of this patent is extended or adjusted under 35 U.S.C. 154(b) by 0 days.

(21) Appl. No.: 14/234,320

(22) PCT Filed: Jul. 9, 2012

(86) PCT No.: PCT/EP2012/063368
§ 371 (c)(1),
(2), (4) Date: Jan. 22, 2014

(87) PCT Pub. No.: WO2012/156539
PCT Pub. Date: Nov. 22, 2012

(65) Prior Publication Data
US 2014/0178534 A1   Jun. 26, 2014

(30) Foreign Application Priority Data

Jul. 22, 2011 (WO) ............... PCT/CN2011/077464

(51) Int. Cl.
*A23G 9/48* (2006.01)
*B26D 1/00* (2006.01)
*A23G 9/32* (2006.01)
*A23G 9/42* (2006.01)
*A23G 9/44* (2006.01)

(52) U.S. Cl.
CPC ............... *B26D 1/0006* (2013.01); *A23G 9/32* (2013.01); *A23G 9/42* (2013.01); *A23G 9/44* (2013.01); *A23G 9/48* (2013.01); *Y10T 83/9411* (2015.04)

(58) Field of Classification Search
CPC ............. A23G 9/48; A23G 9/32; A23G 9/42; A23G 9/44
USPC ............................................. 426/101, 279, 91
See application file for complete search history.

(56) References Cited

U.S. PATENT DOCUMENTS

| 1,429,405 A | 9/1922 | Carter et al. |
| 2,112,173 A | 3/1938 | Broaddus |
| 2,801,922 A * | 8/1957 | Sabin Oprean ............... 426/101 |

(Continued)

FOREIGN PATENT DOCUMENTS

| CN | 200976814 | 11/2007 |
| CN | 200976814 Y * | 11/2007 |

(Continued)

OTHER PUBLICATIONS

Eskimo Monkey. "Nestle's first peelable ice cream rolls out worldwide." Feb. 16, 2011.*

(Continued)

*Primary Examiner* — Erik Kashnikow
*Assistant Examiner* — Ericson M Lachica
(74) *Attorney, Agent, or Firm* — K&L Gates LLP

(57) ABSTRACT

The present invention relates to a frozen confectionery product comprising a core consisting of a frozen confection, wherein the core is coated with a frozen flexible edible gel layer, characterized in that the gel layer is provided with at least one cutting line extending spirally over the gel layer, said cutting line allowing to peel-off the gel-layer in a spiral. It furthermore relates to an apparatus for manufacturing same, and to a cutting device for use in that method.

10 Claims, 3 Drawing Sheets

(56) References Cited

U.S. PATENT DOCUMENTS

| | | | |
|---|---|---|---|
| 3,752,678 A | * | 8/1973 | Jenkinson et al. ............ 426/302 |
| 4,911,937 A | | 3/1990 | Crosello et al. |
| 6,379,724 B1 | | 4/2002 | Best et al. |
| 6,548,097 B1 | | 4/2003 | Best et al. |
| 6,645,538 B2 | * | 11/2003 | Best et al. ........................ 426/91 |
| 2002/0192337 A1 | * | 12/2002 | Best et al. .................... 426/100 |
| 2009/0130264 A1 | | 5/2009 | Bartkowska et al. |

FOREIGN PATENT DOCUMENTS

| | | |
|---|---|---|
| EP | 05450692 | 10/1991 |
| EP | 1767099 | 3/2007 |
| EP | 2025241 | 2/2009 |
| WO | 0241702 | 5/2002 |
| WO | 02071862 | 9/2002 |

OTHER PUBLICATIONS

Peel a Pop. Jul. 2008.*

"Spiral." Oxford English Dictionary First Edition. 1914. <http://www.oed.com/view/Entry/186804?isAdvanced=false&result=1&rskey=XITPaB&> Accessed May 27, 2015.*

"Peel a Pop," GNPD, Jul. 1, 2008, XP002684430. 1 page.

Search Report for related international application PCT/EP2012/070607 mailed Oct. 18, 2012.

Written Opinion for related international application PCT/EP2012/070607 mailed Oct. 18, 2012.

"Spiral." Oxford English Dictionary First Edition. 1914. <http://www.oed.com/view/Entry/186804 ?isAdvanced=false&result=1 &rskey=XITPaB&> Accessed May 27, 2015.

Chinese Office Action for Application No. 201280052341.1 dated Mar. 10, 2015, 11 pages.

Awesome "1000 Awesome Things #908 Peeling an orange in one shot" pp. 1-9, Oct. 2008-Sep. 2011 http://1000awesomethings.com/2008/1 0/28/908-peeling-an-orange-in-one-shot/.

Levenstein("Orange Peel Origami Gets Paper Folding Foodies Juiced" pp. 1-5 Jan. 21, 2011 http://inventorspot.com/articles/orange_peel_origami_gets_paper_fold.

Eskimo Monkey. Nestle's first peelable ice cream rolls out worldwide, Nestle Global, Feb. 16, 2011. 2 pages.

Search Report for international application PCT/EP2012/063368 mailed Feb. 27, 2013.

Written Opinion for international application PCT/EP2012/063368 mailed Feb. 27, 2013.

* cited by examiner

FROZEN CONFECTIONERY PRODUCT WITH A PEELABLE GEL COATING AND METHOD FOR MANUFACTURING SAME

CROSS REFERENCE TO RELATED APPLICATIONS

The present application is a National Stage of International Application No. PCT/EP2012/063368, filed on Jul. 9, 2012, which claims priority to International Application No. PCT/CN2011/077464, filed Jul. 22, 2011, the entire contents of which are being incorporated herein by reference.

FIELD OF THE INVENTION

The present invention relates to a frozen confectionery product with a peelable gel coating and to a method and an apparatus for manufacturing the same.

BACKGROUND OF THE INVENTION

Frozen confectionery products consisting entirely of a frozen gel or comprising a frozen gel are already known and are popular in particular with children.

One example for a frozen confectionery product comprising a core consisting of a frozen confection, said core being at least partially coated with a frozen flexible edible gel layer, is the frozen dessert stick "Eskimo Monkey" which is sold by Nestlé Thailand. This product comprises an ice-cream core being coated with a frozen flexible edible gel layer. This gel layer can be peeled of by the consumer and eaten separately. Since the gel is resistant to liquefaction, even in the defrosted state, the product parts that have been peeled down by the consumer remain intact without melting and dripping. To facilitate the peeling, four longitudinal cutting lines are provided in the gel layer, so that four flaps of peel can be peeled off. One thereby achieves a banana-style peeling effect.

As it becomes clear from the above, an important feature of the gel used to form the peelable gel layer is that it resists to meltdown even after complete defrosting. This is achieved by the addition of stabilisers such as locust bean gum, kappa-carrageenan, sodium alginate or pectin to the mix. EP 1339290 A2 describes such a jelly or gel and its use in a composite frozen confectionery product. The content of this document is incorporated herein by reference.

So far there exist only products allowing a very simple peeling effect, i.e. using longitudinal cutting lines so that flaps can be peeled down. Any attempts to provide different product concepts still involving a similar "play effect" have failed.

OBJECT OF THE INVENTION

It is thus the object of the present invention to provide a novel and appealing frozen confectionery product giving a different experience to Consumers. Another object of the invention is it to provide a suitable method and the necessary tools for making such a product.

SUMMARY OF THE INVENTION

This object is achieved by the product, the method, and the cutting tool disclosed herein.

The frozen confectionery product according to the invention is characterized in that the gel layer is provided with at least one cutting line extending spirally over the gel layer, said cutting allowing to peel-off the gel-layer in a continuous spiral.

This spiral peeling, wherein the complete gel layer can be peeled off in one piece, has an improved play-value and renders the product very attractive.

According to a preferred embodiment of the invention, the product comprises a holder stick having an upper portion which is inserted into the core. This allows easy handling and consumption. The consumer can hold the stick with one hand, and peel off the gel layer with the other hand or using the teeth. Alternatively it is also possible to make products without a stick, for example in a dome shape or in a shape imitating the shape of a fruit such as an apple or a pear. These products can then be consumed as a dessert using a plate and a spoon.

According to a preferred embodiment of the invention, the gel layer comprises one or more gelling hydrocolloids, in particular a polyanionic gelling hydrocolloid. This leads to the desired consistency and peelablity. Gelling properties can be achieved by various stabilisers and combinations thereof. A overview of stabilisers used in ice cream and indications on its gelling properties can be found in literature such as "Ice Cream, Sixth Edition, R. T. Marshall, H. D. Goff, R. W. Hartel eds., Kluwer Academic/Plenum Publishers, 2003. Optionally the gel layer can comprise a gelation controller or inhibitor. This reduces the texture degradation that normally occurs when a gel is stored hot in its liquid state for a longer time, or when it is cooled down and then reheated. According to a preferred embodiment of the invention, the gel layer is made using a recipe as described in EP 1339290 B1 or its US equivalent U.S. Pat. No. 6,548,097 B1, both of which are incorporated herein by reference. In principle, any recipe that allows it to make a gel can be envisaged.

Preferably the gel layer has a thickness of between 2 and 6 mm, even more preferably around 3-5 mm. A gel layer which is too thin makes the peeling difficult, since the gel layer may rupture. A gel layer which is too thick is not desirable as it is more difficult to peel, and because of the relatively high sugar content of the gel which has a negative impact on the nutritional characteristics of the product.

Optionally the gel layer may contain inclusions such as fruit pieces, confectionery pieces or other.

It should also be noted that the gel layer does not have to cover the core completely, but may cover only a part or parts of the product.

According to a preferred embodiment of the invention, the cutting line (16) has an inclination of between 3° and 60°, preferably between 5° and 25°, with respect to a plane extending perpendicularly to the symmetry axis of the spiral. In the case where the product comprises a stick, this axis corresponds to the axis of the inserted stick.

The cutting line can either be straight to form a simple spiral or ondulated. There may be several such cutting lines, e.g. two cutting lines extending spirally forming a double helix.

The frozen confection forming the core can comprise ice cream, water ice, sherbet, or sorbet, and obviously any flavor can be chosen.

According to the invention, the method for manufacturing the frozen confectionery product comprises the following steps:

filling a first mix into a mould, freezing the mix so that it forms the gel layer in the mould and sucking off the excess mix, thereby obtaining a shell consisting of the frozen gel layer, filling a second mix forming the core consisting of a frozen confection into said shell, freezing and demoulding the product, and cutting the at least one cutting line into the frozen gel layer using a cutting tool.

It should be noted that the product according to the invention can also be made in an extrusion process. In this case the core is extruded in the desired shape, for example in a bar shape, and then coated with the gel layer.

As already mentioned above, it is possible to coat only a part of the product with the gel layer.

According to the invention, the cutting tool comprises at least two elements, for reasons of simplicity preferably two halves, but arrangements with three, four or even more elements are also possible. Each element or half comprises
- a void with an inner contour corresponding to a part of the outer contour of the product to be cut, and
- at least one set of knives extending in parallel to each other along the inner contour of the void, wherein the sets of knives of the at least two elements form together the cutting line extending spirally over the gel layer and provide a cut through the gel layer.

The use of this cutting tool makes it extremely simple to cut the desired spiral cutting line into the gel layer. The product is kept in a fixed position, e.g. held by its stick if it comprises one. The elements of the cutting tool are then closed around the product, with the inner contour of their voids, once the tool is closed, corresponding to the outer contour of the product. The knives extending along the inner contour of the void will then be pushed into the gel layer and thereby cut the desired cutting line. Afterwards the cutting tool is opened, i.e. the elements are moved apart and away from the product, and the product which is now provided with the desired cutting line can be further processed or packaged.

Neither the product nor the cutting knives have to be rotated, so that no driving mechanism and associated control are needed, and no torsion force is exerted on the stick or the mechanism holding the product in the case of a product without a stick. Appropriate cutting tools can be designed for virtually any product shape, one is in particular not limited to cylindrical or symmetrical products. While a cutting tool consisting of two elements, such as two halves, may be the preferred solution for products having a simple shape and for relatively simple cutting patterns, more complex product shapes may require the use of three or more elements that are closed around the product during the cutting process. With regard to the inclination of the cutting line extending spirally over the gel layer, a tool consisting of two halves is usually preferred for smaller angles such as up to 20°, whereas for angles above 20°, it may be preferable to use a tool consisting of three or more elements to achieve the desired cutting line.

Within the frame of the present invention, the knives are designed and arranged in such a way that they cut the desired continuous spiral line into the gel layer. The blades of the knives are sufficiently deep, and the void of the elements of the tool are fitting the product in such a way, that the cutting line extends fully through the gel layer up to the core. Typically the depth of cutting corresponds to the thickness of the skin layer or is slightly bigger.

Apart from a single cutting line extending spirally, two spiral cutting lines can be produced forming a double-helix pattern. Also 3 or more cutting helices can be produced this way.

It should be noted, however, that in principle the cutting tool can be used to cut virtually any desired pattern into a gel layer. One may for example cut rectangles or other shapes into the gel layer that can be peeled off, thereby forming window-like spaces without a gel layer through which the core appears.

Furthermore, the cutting tool can not only be used for cutting, but it can also be used to emboss shapes or decorative elements into a gel layer, either in addition to or instead of the cutting. In this case, part or all of the knives are replaced by knife-like structures without a sharp blade or embossers. These variants are not within the scope of the present invention, however.

According to a preferred embodiment of the invention, the cutting tool furthermore comprises an insert holding the product during cutting and during removal of the sets of knives. This avoids that parts of the gel layer stick to the knives when the cutting tool is opened.

FIGURES

The present invention is further described hereinbelow referring to the accompanying drawings which illustrate one preferred embodiment of the invention.

EXAMPLE

Figure 1:
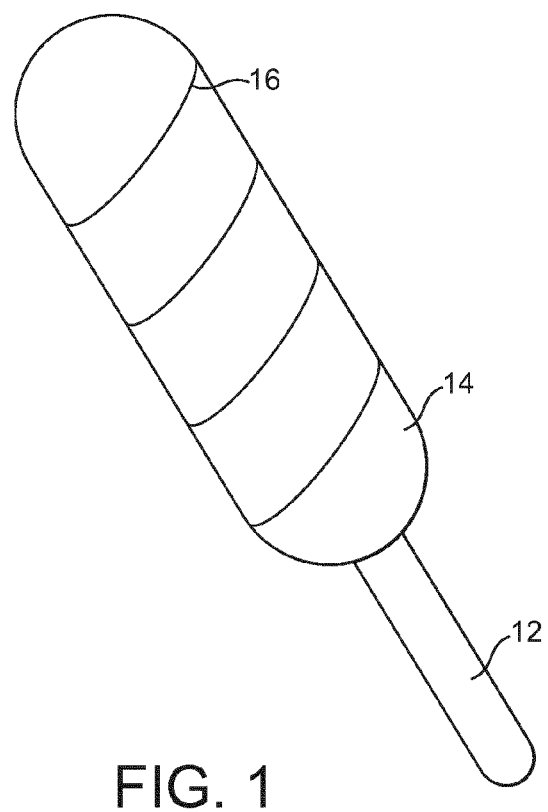
FIG. 1 shows an example of a frozen confectionery product according to the invention.
Figure 2:
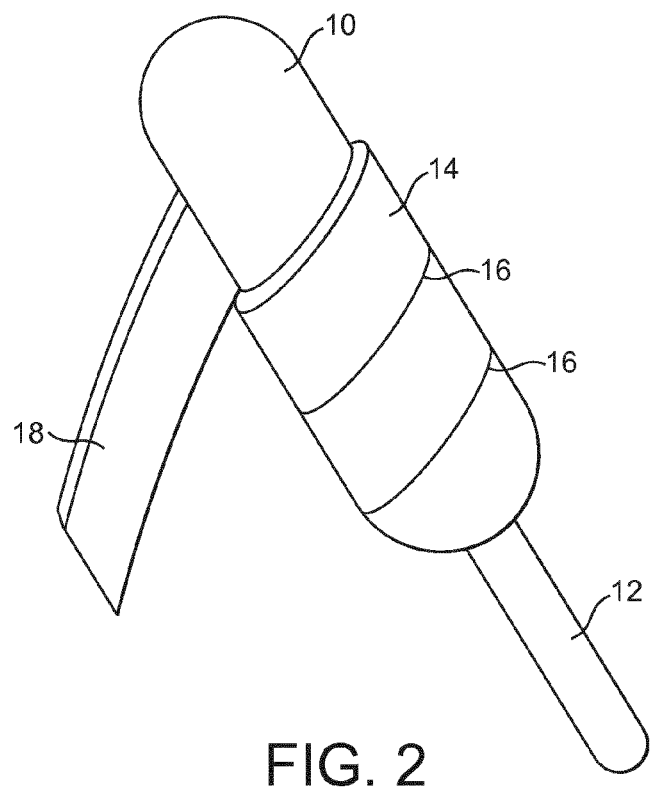
FIG. 2 shows the product of FIG. 1 with the gel layer being partially peeled off

FIGS. 1 and 2 show a frozen confectionery product according to the invention which comprises a cylindrical ice-cream core 10 (cf. FIG. 2) which is completely coated with a frozen flexible edible gel layer 14. A cutting line 16 extends spirally over the gel layer 14 and allows to peel-off the gel-layer 14 in a continuous spiral 18 (cf. FIG. 2).

The product is produced as follows:

For the gel layer, a mix is prepared according to the following recipe:

| | |
|---|---|
| Corn syrup solids | 10% |
| Sucrose | 25% |
| Citric acid | 0.5% |
| Carrageenan | 0.4% |
| Locust bean gum | 0.3% |
| Colors, flavors | 1% |
| Remainder is water | |

The mix is pasteurized at 85° C. for 30 seconds and filled into moulds at a mix temperature of 50 C.

As already mentioned above, it is also possible to use a recipe containing in addition to a polyanionic gelling hydrocolloid, or any other gelling agent, a gelation controller or inhibitor. In particular one of the recipes described in EP 1339290 B1 or U.S. Pat. No. 6,548,097 B1 can be used. In this case the mix can be cooled down after its preparation and stored in the cooled down state. Due to the added gelation controller or inhibitor it can be kept in this state for a relatively long period of time without any degradation. Before use, the mix is reheated, additives that will trigger the gelation are added, and the mix is then processed in the same way as the mix without gelation controller or inhibitor.

The moulds containing the gel mix are cooled in a cold brine bath until a frozen layer with a thickness of around 3 to 5 mm is formed. The remaining mix, which is still liquid, is then sucked back out of the mould. One thereby obtains a shell of edible, flexible frozen gel in the mould.

The shell is then filled with a standard vanilla ice cream mix. A wooden stick is inserted into the product and the product is frozen completely.

Once frozen, the product is demoulded. For the demoulding, the mould is warmed up through a warm liquid that is sprayed on the outside of the mould. This allows the surface layer of the product to warm up slightly and to soften, so that demoulding is facilitated. The softening also helps to perform the subsequent process step of cutting.

Figure 3:
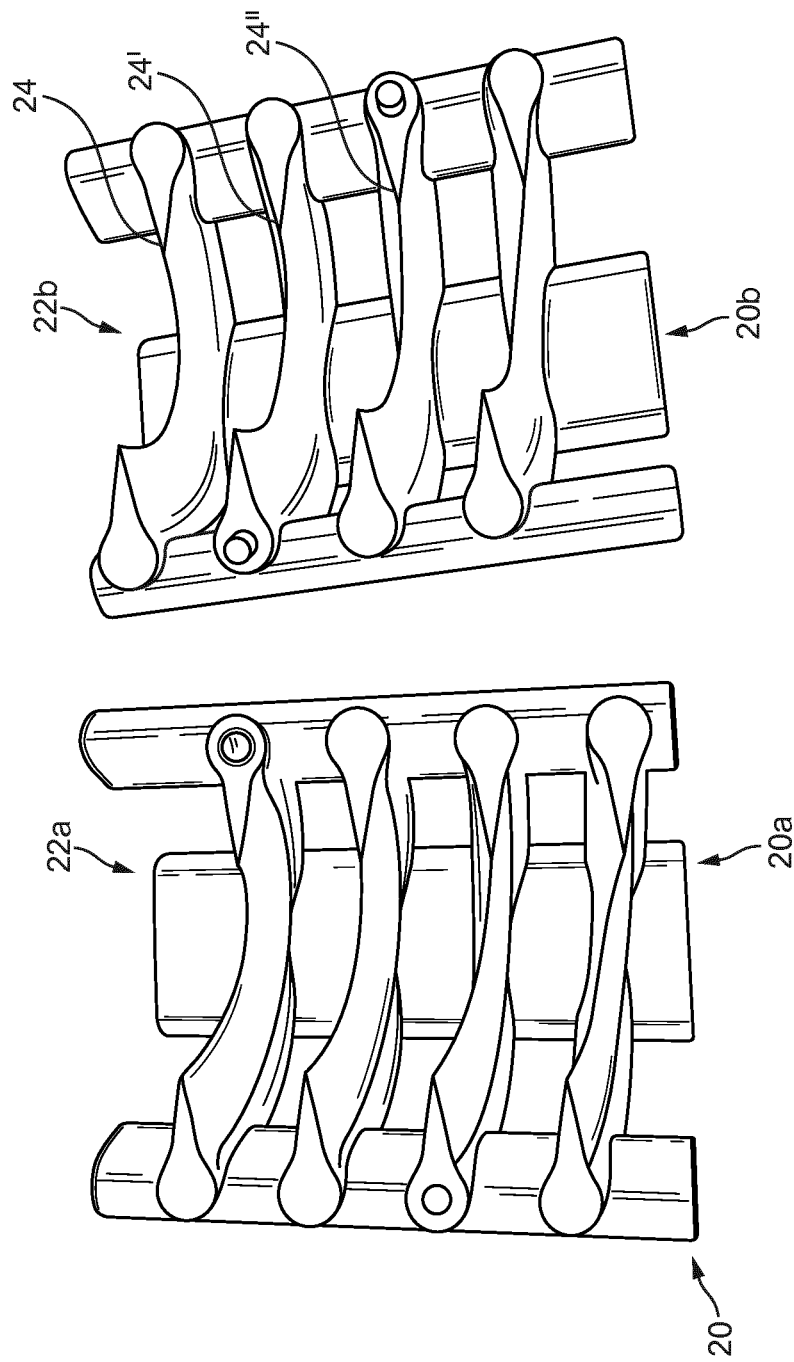
FIG. 3 shows an example of a cutting tool according to the invention
Figure 4:
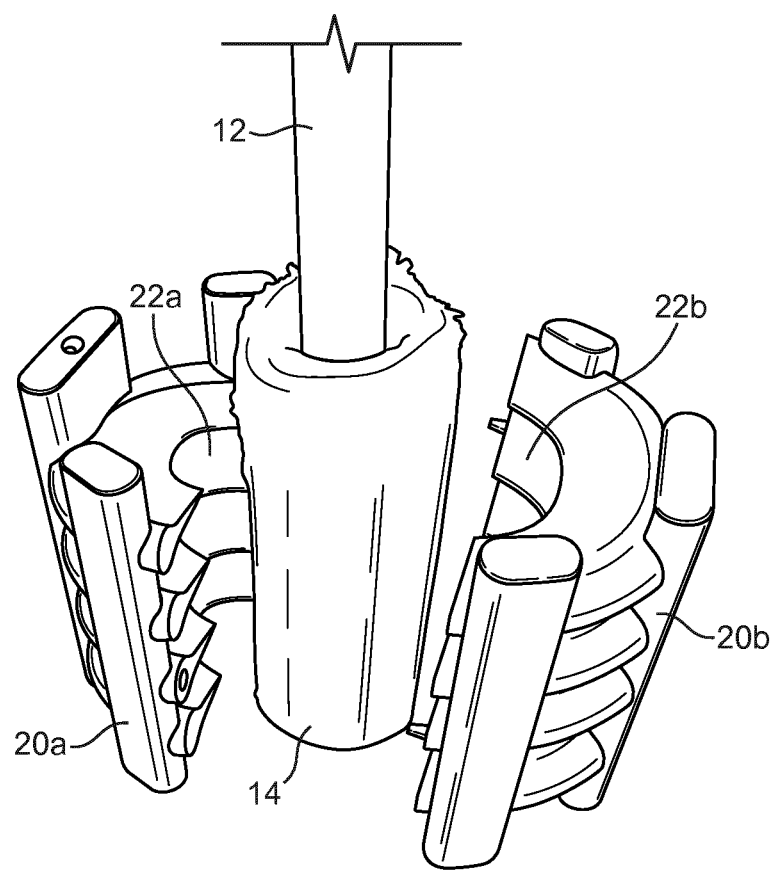
FIG. 4 shows the cutting tool of FIG. 3 in use.

In the following step, the cutting lines are cut into the gel layer 14 using a cutting tool shown which is shown in FIGS. 3 and 4. The cutting tool 20 consists of two halves 20a, 20b, each of the halves having a void 22a, 22b which has the form of a half-cylinder. The voids are limited in each of the two halves 20a, 20b by a set of knives 24, 24', 24". In the present case, four substantially parallel knives 24, 24', 24" are arranged substantially in parallel along the void. To cut the spiral into the gel layer, the two halves 20a, 20b of the cutting tool 20 are placed on either side of the product (cf. FIG. 4) and then pushed towards the product until the knives 24, 24', 24" from both halves touch each other. Together, the knives 24, 24', 24" from both halves form a spiral that is pressed into the gel layer at the surface of the product. The dimensions of the tool 20 and the knives 24, 24', 24" are chosen in such a manner that the gel layer is completely cut through, i.e. the cutting lines 16 will have a depth of at least 3 mm.

The cutting tool 20 is then opened, i.e. the two halves 20a, 20b are taken apart.

As it is illustrated in FIG. 2, when the product is allowed to warm up slightly, the gel layer 14 at the surface can be peeled off from the product core in a spiral.

REFERENCE NUMERALS

10 Core
12 Stick
14 Gel Layer
16 Cutting line
20 Cutting tool
20a, 20b Element of cutting tool
22a, 22b Void
24', 24", 24" Knife

The invention claimed is:

1. A frozen confectionery product comprising:
a core comprising a frozen confection, the core is at least partially coated with a frozen flexible edible gel layer, the gel layer is provided with at least one line cut therein extending spirally over the gel layer, the line cut therein allowing the gel layer to peel off in one piece in a continuous spiral.

2. The frozen confectionery product according to claim 1, comprising a holder stick having an upper portion which is inserted into the core.

3. The frozen confectionery product according to claim 1, wherein the gel layer comprises a gelling hydrocolloid.

4. The frozen confectionery product according to claim 3, wherein the gel layer comprises a gelation controller or gelation inhibitor.

5. The frozen confectionery product according to claim 1, wherein the gel layer has a thickness of between 2 and 6 mm.

6. The frozen confectionery product according to claim 1, wherein the gel layer comprises inclusions.

7. The frozen confectionery product according to claim 1, wherein the line cut therein has an inclination of between 3° and 60° with respect to a plane extending perpendicularly to a symmetry axis of the spiral.

8. The frozen confectionery product according to claim 1, wherein the line cut therein is undulated.

9. The frozen confectionery product according to claim 1, wherein the frozen confection forming the core is selected from the group consisting of ice cream, water ice, sherbet, and sorbet.

10. The frozen confectionery product according to claim 1, wherein the gel layer has a thickness of between 3 and 5 mm.

\* \* \* \* \*